(No Model.) 2 Sheets—Sheet 1.
F. R. PACKHAM.
FURROW OPENING DEVICE FOR SEEDING MACHINES.
No. 586,107. Patented July 13, 1897.
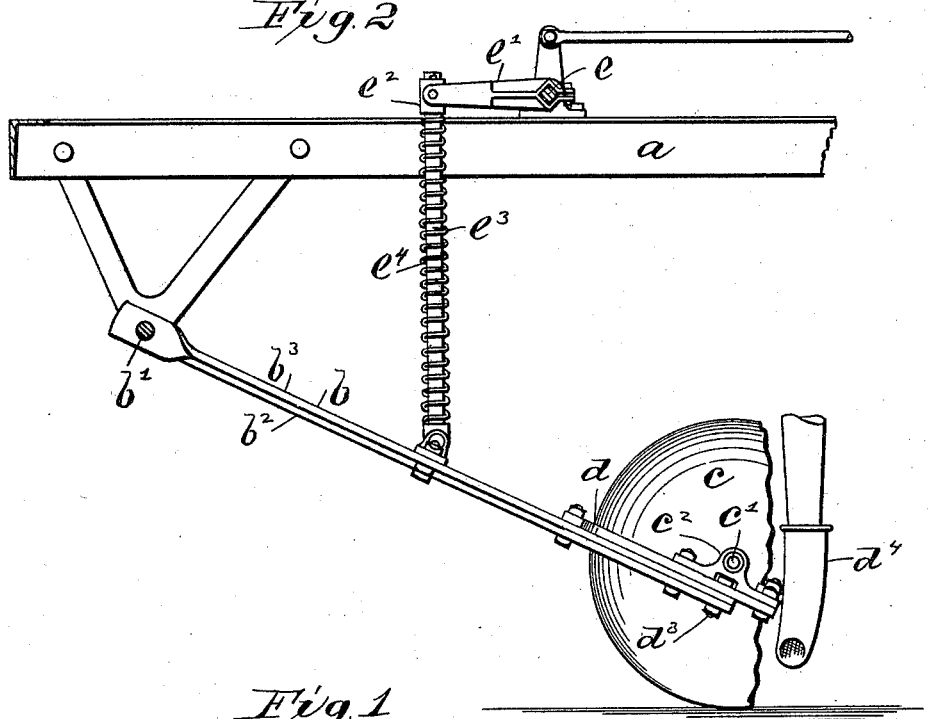
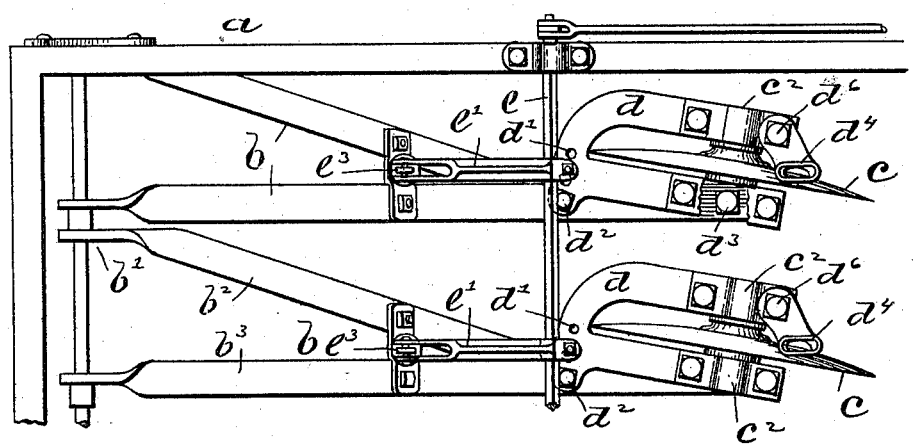
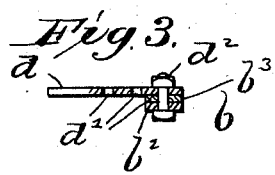
Witnesses
G. M. Gridley
Chas. J. Welch
Inventor
Frank R. Packham
By his Attorney

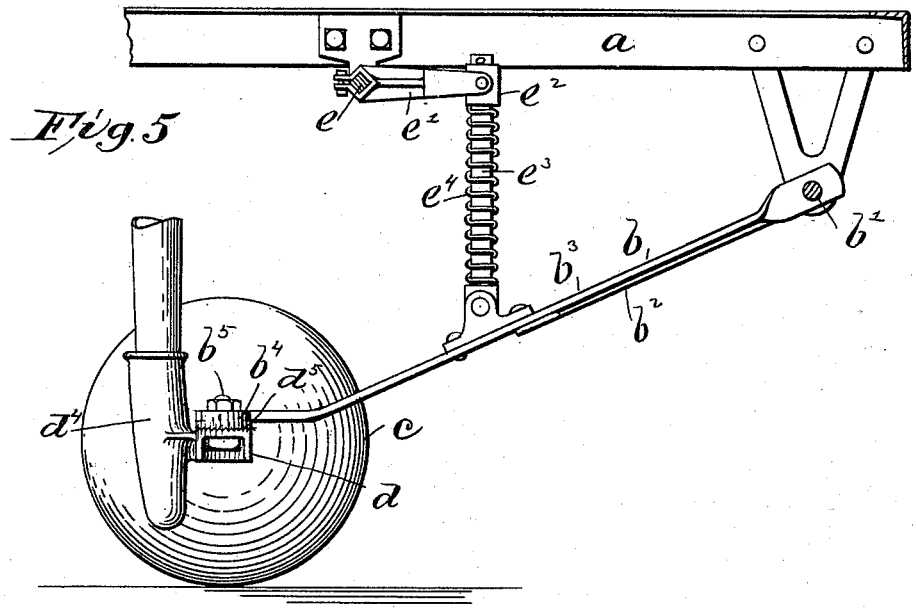
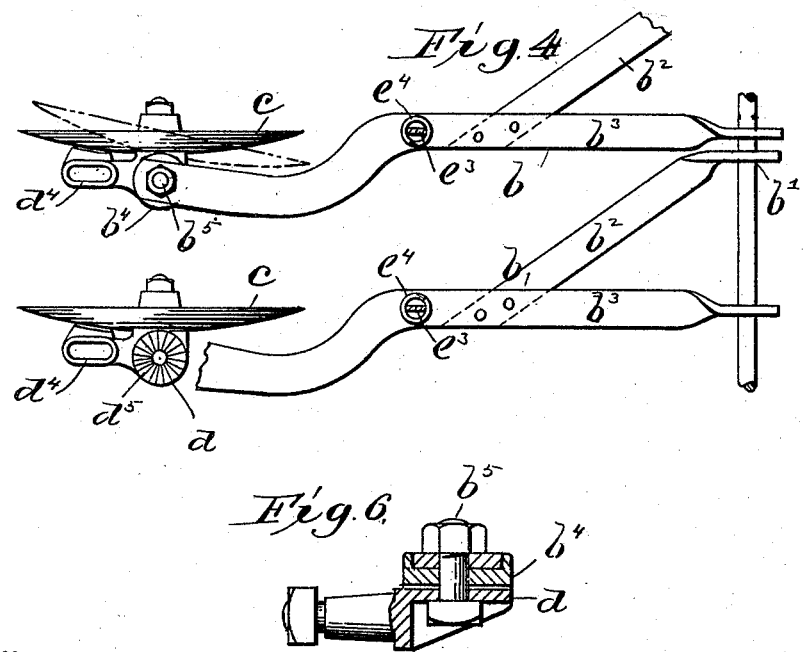

UNITED STATES PATENT OFFICE.

FRANK R. PACKHAM, OF SPRINGFIELD, OHIO, ASSIGNOR TO THE SUPERIOR DRILL COMPANY, OF SAME PLACE.

FURROW-OPENING DEVICE FOR SEEDING-MACHINES.

SPECIFICATION forming part of Letters Patent No. 586,107, dated July 13, 1897.

Application filed May 17, 1897. Serial No. 636,859. (No model.)

*To all whom it may concern:*

Be it known that I, FRANK R. PACKHAM, a citizen of the United States, residing at Springfield, in the county of Clark and State of Ohio, have invented certain new and useful Improvements in Furrow-Opening Devices for Seeding-Machines, of which the following is a specification.

My invention relates to improvements in furrow-opening devices for seeding-machines.

My invention consists in the construction and combinations of parts hereinafter described, and set forth in the claims.

In the accompanying drawings, Figure 1 is a plan view of a portion of the framework of a seeding implement to which my invention is shown applied, some of the parts being shown broken away. Fig. 2 is a sectional view of the same, showing the furrow-opening devices in cross-section, but partly broken away to more clearly illustrate the seeding-conduit. Fig. 3 is a detail of the same. Figs. 4 and 5 are respectively a partial plan and elevation of devices modified in construction. Fig. 6 is a detail view of the parts shown in Figs. 4 and 5.

Like parts are represented by similar letters of reference in the several views.

In the said drawings, $a$ represents a frame of any suitable construction, in which my furrow-opening devices are secured and to which they are attached. They are attached to the frame in any suitable manner by drag-bars $b$, which are preferably pivoted at their front ends, as shown at $b'$.

The furrow-opener proper consists of a disk $c$, of a concavo-convex form, mounted upon suitable journals $c'$, which turn in bearings $c^2$ in a frame or support which is adjustably secured to the drag-bars. In order to form a furrow by this disk $c$, it is desirable that the disk stand at an angle to the line of draft, and in order to change the size and character of the furrow it is desirable that the angle of the disk may be changed. To provide for this, I mount the disk in a frame or support $d$, which is adjustably connected to the drag-bar $b$. In Figs. 1 and 2 the frame $d$ is shown of a bifurcated construction, with the bearings $c^2$ mounted on the rear fork portion thereof, while the front portion is provided with a series of opening $d'$, adapted to receive a connecting-bolt $d^2$, which passes through either one of said openings and the drag-bar $b$. A connecting-bolt $d^3$, which also passes through one fork of the frame and through the rear end of the drag-bar, preferably on a line with the axis of the disk, serves as a pivot for the adjustable frame or support $d$. There is connected to the frame $d$ and adapted to turn therewith a conduit $d^4$, which stands behind and adjacent to the disk $c$, so that as the disk is adjusted this conduit occupies the same relative position thereto and is adapted to deposit the seed in the furrow formed by said disk.

Each of the drag-bars $b$ is preferably formed of two parts $b^2$ and $b^3$, the part $b^3$ being substantially straight and the part $b^2$ being bent at an angle to form a brace, the respective parts being adapted to overlap at their rear ends and extend from this point backwardly parallel with each other, thus forming a rigid support for the furrow-opening disk and its frame and adapted to resist lateral movement.

In Figs. 4 and 6 I have shown the constructions modified. In this case the frame or support $d$, which carries the disk and the conduit $d^4$, is formed with a series of serrations $d^5$, adapted to engage with a similarly-serrated plate or projection $b^4$ on the drag-bar $b$, the parts being adjustably held together by a bolt $b^5$, which extends through the same, thus permitting the angle of the disk and the conduit to be readily changed with reference to the drag-bar $b$.

A transverse shaft $e$, extending across the frame and provided with projecting bifurcated fingers $e'$, which engage with sliding sleeves $e^2$ on a link or stirrup $e^3$, having a spring $e^4$ surrounding the same and extending from the sliding sleeves $e^2$ to a point near the drag-bar $b$, serves to raise and lower the furrow-openers and apply pressure thereto.

It should be noted that in the constructions shown in Figs. 1 and 2 the conduit $d^4$ is mounted on the frame $d$ by means of a bolt $d^6$, whereby said conduit may be adjusted with reference to the furrow-opening disk, while at the same time the disk and conduit maintain the same relative positions when the frame is adjusted with reference to the drag-bar. In Figs. 4 and 5 the conduit $d^4$ is shown integrally connected to the supporting-frame $d$, so that it maintains at all times the same relative position with reference to said disk.

Having thus described my invention, I claim—

1. In a furrow-opening device, a drag-bar, a frame or support connected to said drag-bar, a concavo-convex disk supported by said frame or support to which it is journaled, and a pivotal connection between said frame or support and said drag-bar, said pivotal connection being arranged in line with the axis of said journaled disk, and means, substantially as described, for holding said frame or support in different positions of adjustment about the pivotal connection so as to change the angle of said disk, substantially as specified.

2. The combination with a drag-bar, of a pivoted frame or support, a disk journaled thereon, a conduit mounted on said frame or support adjacent to said disk and in the rear of the axis thereof, and means, substantially as described, for adjusting the angle of said frame or support with reference to said drag-bar, substantially as and for the purpose specified.

3. The combination with a supporting-frame, a series of drag-bars pivotally mounted thereon, an adjustable frame or support pivotally mounted on the free ends of each of said drag-bars, a conduit and disk supported on said frame, means for adjusting said frame with reference to said drag-bars, and a lifting and pressure device arranged between the pivoted end of said drag-bars and said furrow-opening disks, substantially as specified.

4. In combination with the drag-bar, a frame pivotally mounted thereon, a furrow-opening disk pivoted on said frame, and a conduit adjustably supported on said frame so as to be adjusted with reference to said disk, said frame being pivoted to said drag-bar and provided with means for holding said frame in different positions of adjustment, substantially as and for the purpose specified.

5. In combination with a drag-bar, a frame or support connected thereto, a journaled disk supported by said frame or support, and a conduit also supported by said frame or support and arranged adjacent to said disk in the rear of the axis thereof, a pivotal connection between said frame or support and said drag-bar, and means for holding said frame in different positions of adjustment with reference to said drag-bar so as to change the angle of said disk, the pivoted connection between said drag-bar and said frame or support being arranged in a plane passing through the axis of said disk, substantially as specified.

In testimony whereof I have hereunto set my hand this 11th day of May, A. D. 1897.

FRANK R. PACKHAM.

Witnesses:
CHAS. I. WELCH,
G. M. GRIDLEY.